(12) United States Patent
Pham et al.

(10) Patent No.: US 7,901,531 B2
(45) Date of Patent: Mar. 8, 2011

(54) FLEXIBLE MANDREL FOR HIGHLY CONTOURED COMPOSITE STRINGER

(75) Inventors: Doan D. Pham, Tacoma, WA (US); Mark Tollan, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 682 days.

(21) Appl. No.: 11/964,133

(22) Filed: Dec. 26, 2007

(65) Prior Publication Data

US 2008/0099597 A1        May 1, 2008

Related U.S. Application Data

(62) Division of application No. 10/904,717, filed on Nov. 24, 2004, now Pat. No. 7,357,166.

(51) Int. Cl.
*B32B 37/10* (2006.01)
*B29C 65/70* (2006.01)
*B29C 70/54* (2006.01)
*B29C 33/76* (2006.01)

(52) U.S. Cl. .......................................... 156/245; 156/285

(58) Field of Classification Search .................. 156/245, 156/285, 581, 583.3; 264/313
See application file for complete search history.

(56) References Cited

U.S. PATENT DOCUMENTS

| 2,517,698 | A | 8/1950 | Muskat |
| 2,739,350 | A | 3/1956 | Lampman |
| 3,795,559 | A | 3/1974 | Horn |
| 4,338,381 | A | 7/1982 | Rogers |
| 4,475,976 | A | 10/1984 | Mittelstadt et al. |
| 4,512,837 | A | 4/1985 | Sarh et al. |
| 4,576,849 | A | 3/1986 | Gardiner |
| 4,786,456 | A | 11/1988 | Witte |
| 5,096,525 | A | 3/1992 | Engwall |
| 5,348,602 | A | 9/1994 | Makarenko et al. |
| 5,387,098 | A | 2/1995 | Willden |
| 5,538,589 | A * | 7/1996 | Jensen et al. .................. 156/581 |
| 6,264,868 | B1 | 7/2001 | Marchant |

FOREIGN PATENT DOCUMENTS

| GB | 842815 | 7/1960 |
| JP | 58076217 | 5/1983 |
| WO | 9606726 | 3/1996 |

OTHER PUBLICATIONS

"Manufacture of Advanced Carbon Fiber Reinforced Advanced Composite Structure With Toughened Epoxy Systems, + 350 F Cure", Boeing Process Specification BAC 5578, Oct. 1, 1985, The Boeing Company, U.S.

* cited by examiner

*Primary Examiner* — Michael A Tolin
(74) *Attorney, Agent, or Firm* — Ostrager Chong Flaherty & Broitman P.C.

(57) ABSTRACT

An aircraft stringer lay-up assembly is provided comprising a contoured curing block and a first mandrel element positioned thereon. The first mandrel assembly includes a first bar assembly having a plurality of rigidity reducing first slots formed along a first mandrel length. The plurality of rigidity reducing first slots protruding partially through a first mandrel depth of the first mandrel element to allow the first bar assembly to conform to the contoured curing block. A composite ply assembly is laid up onto the first mandrel element and cured while conformed to said contoured curing block such that a contoured composite stringer element is generated.

16 Claims, 2 Drawing Sheets

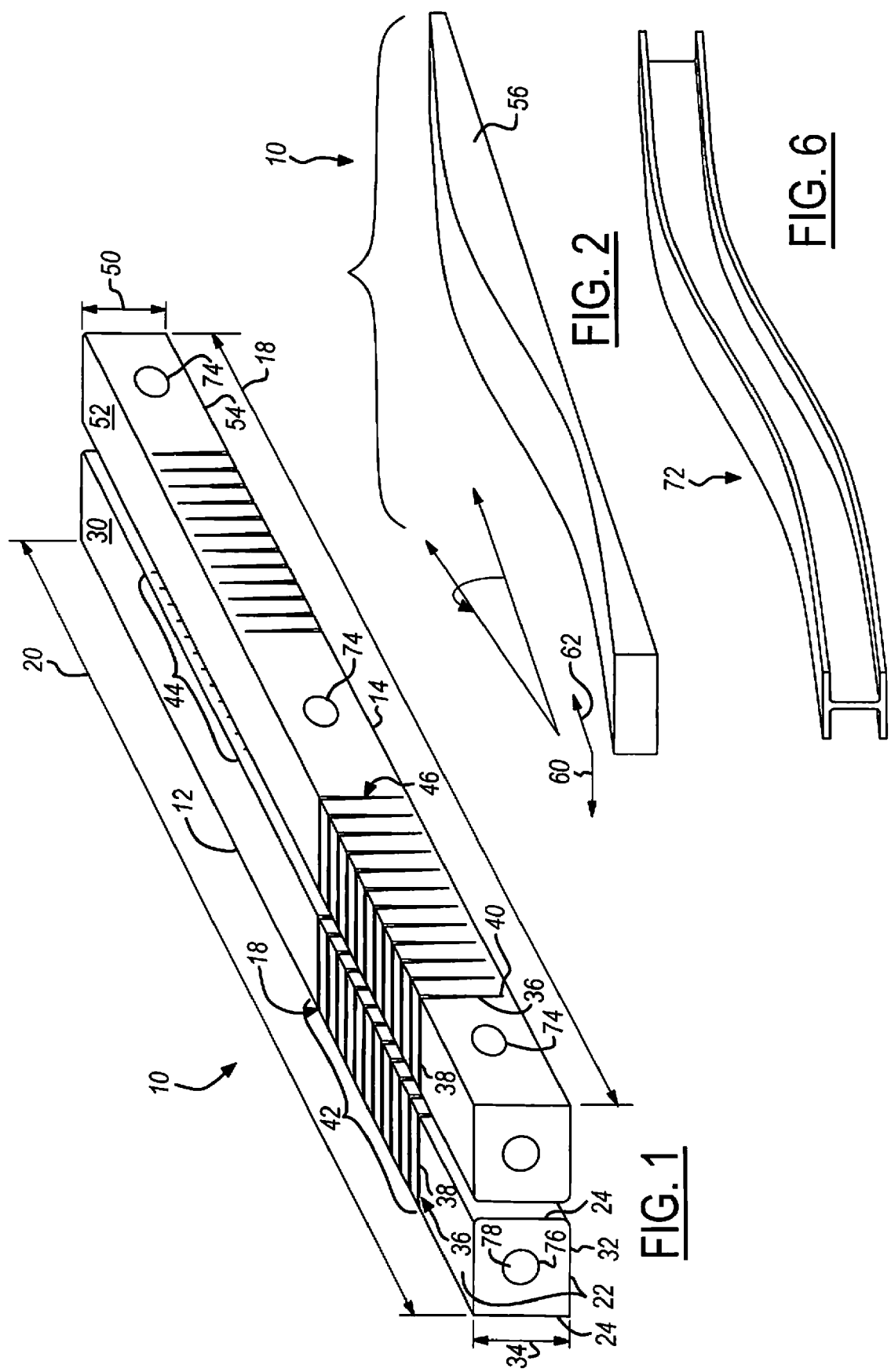

FLEXIBLE MANDREL FOR HIGHLY CONTOURED COMPOSITE STRINGER

CROSS-REFERENCE TO RELATED APPLICATIONS

This application is a divisional application of U.S. application Ser. No. 10/904,717, filed Nov. 24, 2004 now U.S. Pat. No. 7,357,166. This application is related to co-pending application Ser. No. 10/904,709.

DESCRIPTION

1. Technical Field

The present invention relates generally to an aircraft composite stringer mandrel and more particularly to a flexible mandrel for the use with an aircraft stringer lay-up assembly to produce a contoured composite stringer element.

2. Background of the Invention

Aircraft components such as stringers have become complex in design and shape due to developing aircraft designs. The complexity of shape in combination with a need for decreased weight/strength ratios requires the use of alternate construction technologies. For this reason, aircraft designers have turned to the use of composite ply assemblies for the manufacture of aircraft stringers. In these manufacturing scenarios, a material ply impregnated with epoxy or similar substance is layed-up onto a mandrel shaped to generated the complex shape. The composite ply assembly is then cured to generate a composite component with the desired complex shape.

Present aircraft designs, however, can require complex contours and twists which can be difficult to implement with existing mandrel technology. Present mandrel assemblies utilize either metal fabricated mandrels or composite mandrel assemblies. Present metal fabricated mandrels are highly resistant and exhibit long life spans. It is difficult, however, to configure these metal mandrel assemblies into the desired complex contours and twists. The common metal mandrel is too stiff to be forced into these contours. The common approach, therefore, has been to turn to composite mandrels capable of being forced into a wider range of complex contours. Composite ply mandrels, however, are easily damaged and have a considerably limited lifespan compared to the metal counterparts. As such, their use undesirably impacts the cost and time involved with composite stringer manufacturing.

It would therefore be highly desirable to have an aircraft stringer lay-up assembly that combined the flexibility and utility of composite mandrel assemblies with the resiliency and cost effectiveness of metal fabricated mandrel assemblies.

SUMMARY OF THE INVENTION

It is therefore an object to the present invention to provide an aircraft stringer lay-up assembly and method with improved flexibility to generate complex shapes, contours, and twists. It is a further object to provide such an aircraft stringer lay-up assembly with improved resiliency and lifespan as compared to composite mandrel assemblies.

In accordance with the objects of the present invention an aircraft stringer lay-up assembly is provided comprising a contoured curing block and a first mandrel element positioned thereon. The first mandrel assembly includes a first bar assembly having a plurality of rigidity reducing first slots formed along a first mandrel length. The plurality of rigidity reducing first slots protruding partially through a first mandrel depth of the first mandrel element to allow the first bar assembly to conform to the contoured curing block. A composite ply assembly is laid up onto the first mandrel element and cured while conformed to said contoured curing block such that a contoured composite stringer element is generated.

Other objects and features of the present invention will become apparent when viewed in light of the detailed description and preferred embodiment when taken in conjunction with the attached drawings and claims.

BRIEF DESCRIPTION OF THE DRAWINGS

FIG. 1 is an illustration of an aircraft stringer lay-up assembly in accordance with the present invention, the assembly illustrated showing a first and second mandrel assembly.

FIG. 2 is an illustration of a contoured curing block for use in the aircraft stringer lay-up assembly illustrated in FIG. 1.

FIG. 6 is an illustration of a contoured composite stringer element generated from the aircraft stringer lay-up assembly illustrated in the above figures.

DESCRIPTION OF PREFERRED EMBODIMENTS

Figure 3:
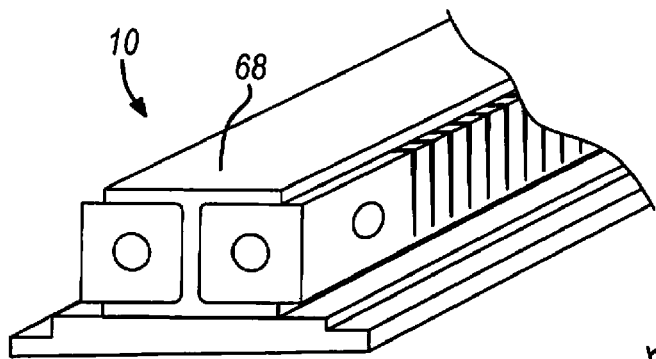
FIG. 3 is an illustration of an aircraft stringer lay-up assembly in accordance with the present invention, the illustration showing the arrangement of components from FIGS. 1 and 2 in addition to the composite ply assembly.

Referring now to FIG. 1, which is an illustration of an aircraft stringer lay-up assembly 10 in accordance with the present invention. The aircraft stringer lay-up assembly 10 includes a first mandrel element 12 and a second mandrel element 14. The mandrel elements 12, 14 are preferably elongated metal beams as illustrated. Traditional metal mandrel configurations suffer from an inability to conform to the complex arrangements necessary for modern stringer lay-up requirements. The present invention, however, provides a unique approach by constructing the first mandrel element 12 from a first bar assembly 16 having a plurality of rigidity reducing first elements 18 formed along its first mandrel length 20. Although a variety of rigidity reducing element 18 are contemplated, one embodiment contemplates the use of slots.

The first mandrel element 12 includes two mandrel vertical surfaces 22, two mandrel side surfaces 24, a right mandrel end surface 26 and a left mandrel end surface 28. The vertical surfaces 22 may be further defined as a first mandrel upper vertical surface 30 and a first mandrel lower vertical surface 32. The plurality of rigidity reducing first slots 18 protrude partially through a first mandrel depth 34 from one of the first mandrel vertical surfaces 22 through both of the mandrel side surfaces 24. This allows the first bar assembly 16 to flex and twist when a plurality of such rigidity reducing first slots 18 are introduced.

Although a variety of slot manufacturing and configurations are contemplated, one embodiment contemplates the use of a plurality of tapered slots 36, each of which has an open end 38 and a tapered end 40. The open end is formed on the first mandrel vertical surface 22 and the tapered end 40 is formed partially through the first mandrel depth 34 such that it is visible from both the first mandrel side surfaces 24. It should be understood that straight slots are also contemplated. The slots may be formed by wire electrical discharged machining such that they may be maintained as very thin slots so as not to disturb the lay-up surfaces of the first mandrel element 12. It is contemplated that the slots 18 will be kept less than 0.01 inches wide and in one embodiment they are 0.0065 inches wide. This allows the desired flexibility of the first mandrel element 12 without impacting lay-up surfaces.

The plurality of rigidity reducing first slots (elements) 18 may be formed in a variety of arrangements along the first mandrel length 20. In one embodiment it is contemplated that the rigidity reducing first slots 18 may be formed as a first group of rigidity reducing first slots 42 and a second grouping of rigidity reducing slots 44. The first grouping 42 is formed on the first mandrel upper vertical surface 30 while the second grouping 44 is formed on the first mandrel lower vertical surface 32. By positioning these groupings 42,44 remotely from one another, the first mandrel element 12 can be curved or bent in differing directions along its length. Each of the plurality of rigidity reducing slots 18 is preferably grouped such that the bending of the first mandrel element 12 tends to close the slots rather than open them. This again preserves the surfaces for lay-up. In the illustrated figure the groupings 42, 44 are positioned at opposing ends, however, a wide variety of groupings and spacings are contemplated. It is likewise contemplated that the second mandrel element 14 may be similarly comprised of a plurality of rigidity reducing second slots 46 along a second mandrel length 48. These second slots 46 protrude partially through a second mandrel depth 50 and may be positioned on either or both of the second mandrel upper vertical surface 52 or the second mandrel lower vertical surface 54.

Figure 5:
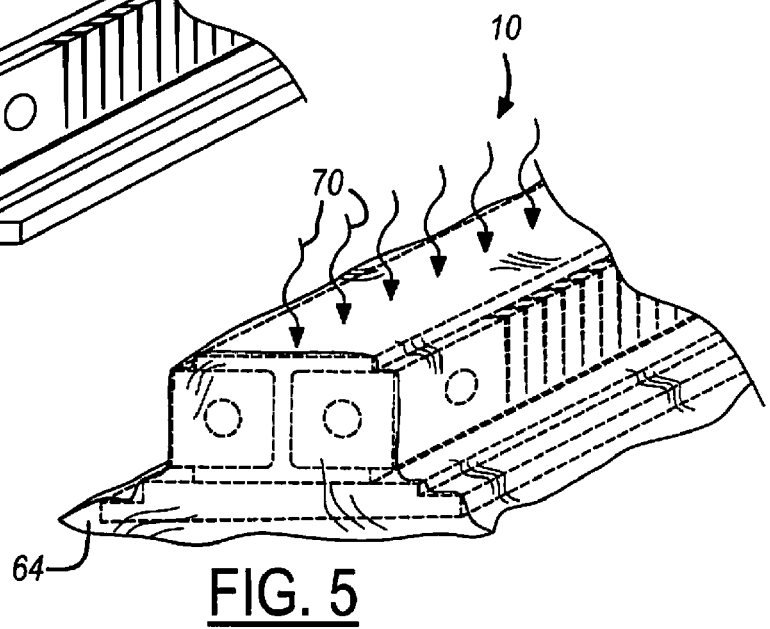
FIG. 5 is an illustration of the aircraft stringer lay-up assembly illustrated in FIG. 4, the assembly subjected to a curing process.
Figure 4:
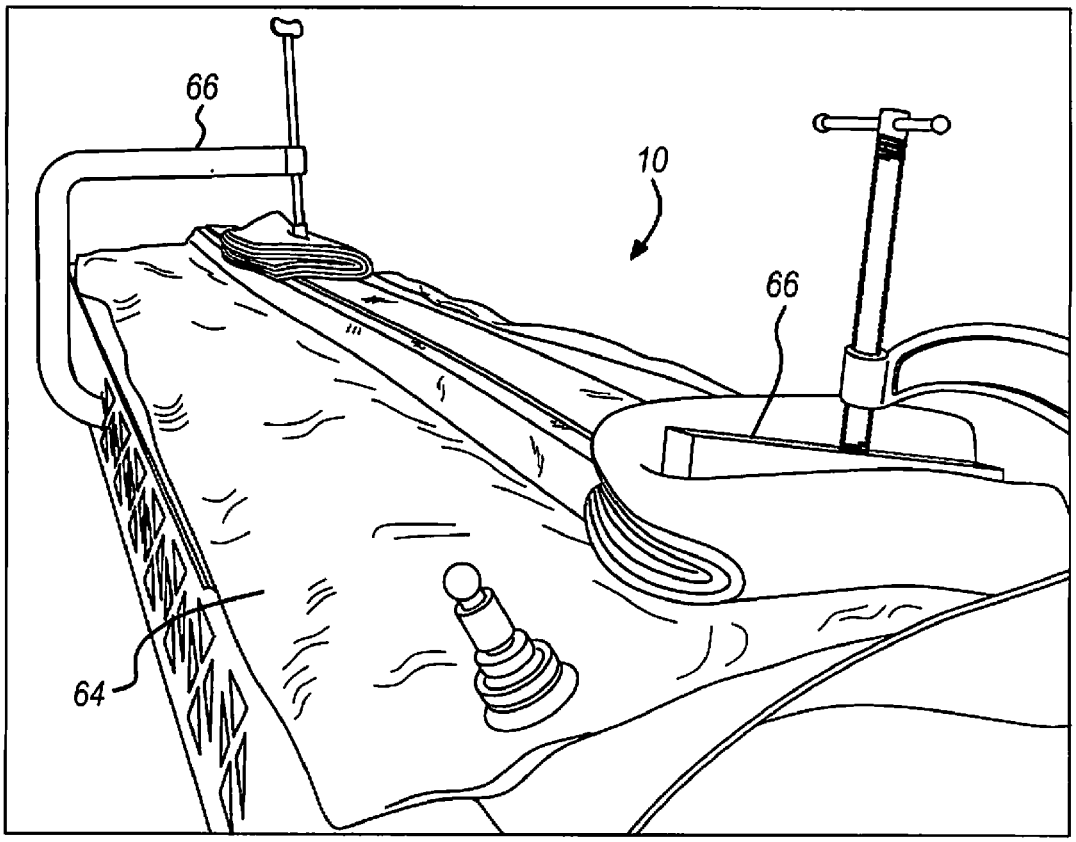
FIG. 4 is an illustration of the aircraft stringer lay-up assembly illustrated in FIG. 3, the illustration showing the addition of a vacuum bag assembly and clamping elements.

Although the plurality or rigidity reducing slots 18, 46 allow the mandrels to be conformed to a wise variety of complex contours, the present invention further contemplates the use of a contoured curing block 56 to facilitate such conformation (see FIG. 2). The contoured curing block 56 includes a complex contour 58 that can be complex in both a first curing block planar direction 60 and a second curing block planar direction 62. This allows twist to be induced. By placing the first mandrel element 12 and/or the second mandrel element 14 onto the contoured curing block 56, the weight of the mandrel can be utilized to conform it into the complex contour 58. Although weight alone may be utilized, it is further contemplated that a vacuum bag assembly 64 (see FIG. 5) or a clamping assembly 66 (see FIG. 4) may facilitate such conformation to the contoured curing block 56.

Once the mandrel elements 12,14 are conformed to the contoured curing block 56, a composite ply assembly 68 may be layed-up on the mandrel elements 12,14. The composite ply assembly 68 may be laid up between the mandrels 12,14 and even between the mandrels 12, 14 and the curing block 56. By laying up the composite ply assembly 68 between the mandrels 12, 14 and over the upper vertical surfaces 30,52 and lower vertical surfaces 32,54, an I-beam arrangement is generated. The composite ply assembly 68 is subjected to curing, commonly through the application of a curing heat 70 (see FIG. 5), wherein it is hardened into a contoured composite stringer element 72 such as the contoured I-beam element illustrated in FIG. 6.

In addition to the main features of the present invention, the present invention further contemplates the use of a plurality of side positioning bores 74 positioned along the mandrel side surfaces 24. This allows the mandrel elements 12,14 to be easily moved and positioned on the contoured curing block 56. In addition, they may be utilized as additional clamping or weighting points to assure proper conformation with the curing block 56 in particularly complex surface areas. Additionally, the present invention contemplates the use of a central bore 76 formed through the first mandrel length 20. A center support wire 78 is positioned within the central bore 76 and runs the length of the first mandrel element 12. By inducing tension in the center support wire 78 the flexibility of the first mandrel element 12 may by varied thereby allowing the first mandrel element 12 to be utilized in a greater range of applications.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A method of laying up an aircraft stringer comprising:
    forming a plurality of rigidity reducing first elements in a first mandrel element along a first mandrel length;
    forming a central bore chamber in said first mandrel element centered through said first mandrel length;
    inserting a center support wire through said central bore chamber, said center support wire controlling flexibility of said first mandrel element;
    placing said first mandrel element on a contoured curing block, said plurality of rigidity reducing first elements allowing said first mandrel element to conform to said contoured curing block; and
    laying up a composite ply assembly onto said first mandrel element as said first mandrel element is conformed to said contoured curing block.

2. A method as described in claim 1, wherein said plurality of rigidity reducing first elements are formed as a plurality of rigidity reducing first slots formed in a first elongated metal beam.

3. A method as described in claim 1, wherein said plurality of rigidity reducing first elements are formed as a plurality of tapered slits including an open end and a tapered end, said open end positioned along a first mandrel vertical surface, said tapered end positioned along a first mandrel side surface.

4. A method as described in claim 1, wherein said plurality of rigidity reducing first elements are formed using wire electrical discharge machining.

5. A method as described in claim 1 further comprising: machining said plurality of rigidity reducing first elements to less than 0.01 inches wide.

6. A method as described in claim 1, wherein said forming said plurality of rigidity reducing first elements comprises: forming a first grouping of rigidity reducing slots along a first mandrel upper vertical surface; and a second grouping of rigidity reducing slots along a first mandrel lower surface.

7. A method as described in claim 1 further comprising: sealing said contoured curing block, said first mandrel element, and said composite ply assembly within a vacuum bag assembly.

8. A method as described in claim 1 further comprising: clamping said first mandrel element to said contoured curing block.

9. A method as described in claim 1 further comprising: forming a plurality of rigidity reducing second elements in a second mandrel element along a second mandrel length; placing said second mandrel element on said contoured curing block adjacent said first mandrel element, said plurality of rigidity reducing second elements allowing said second mandrel element to conform to said contoured curing block; and laying up said composite ply assembly between said first mandrel element and said second mandrel element to form a contoured composite stringer.

10. A method as described in claim 9, further comprising: laying up said composite ply assembly over a first mandrel upper vertical surface and a second mandrel upper vertical surface; laying up said composite ply assembly over a first mandrel lower vertical surface and a second mandrel lower vertical surface; and curing said composite ply assembly such that said contoured composite stringer element comprises a contoured I-beam element.

11. A method as described in claim 1, further comprising the step of curing said composite ply assembly such that a contoured composite stringer is generated.

12. A method of laying up an aircraft stringer comprising:
forming a plurality of rigidity reducing first slots in a first elongated metal beam of a first mandrel element along a first mandrel length;
forming a central bore chamber in said first mandrel element centered through said first mandrel length;
inserting a center support wire through said central bore chamber, said center support wire controlling flexibility of said first mandrel element;
arranging said first mandrel element into a complex contour; and
laying up a composite ply assembly onto said first mandrel element while said first mandrel element is in said complex contour.

13. A method as described in claim 12, further comprising: placing said first mandrel element on a contoured curing block contoured across both a first curing block planar direction and a second curing block planar direction to generate said complex contour.

14. A method as described in claim 12, further comprising: forming a plurality of rigidity reducing second slots in a second mandrel element along a second mandrel length; arranging said second mandrel element in said complex contour adjacent said first mandrel element; and laying up said composite ply assembly between said first mandrel element and said second mandrel element.

15. A method as described in claim 14 further comprising: laying up said composite ply assembly over a first mandrel upper vertical surface and a second mandrel upper vertical surface; laying up said composite ply assembly over a first mandrel lower vertical surface and a second mandrel lower vertical surface; and curing said composite ply assembly to generate a contoured composite stringer element comprising a contoured I-beam element.

16. A method as described in claim 12, further comprising the step of curing said composite ply assembly such that a contoured composite stringer is generated.

* * * * *